Feb. 16, 1937. R. E. FROST 2,070,891
ELECTRICAL SWITCH
Filed July 18, 1934
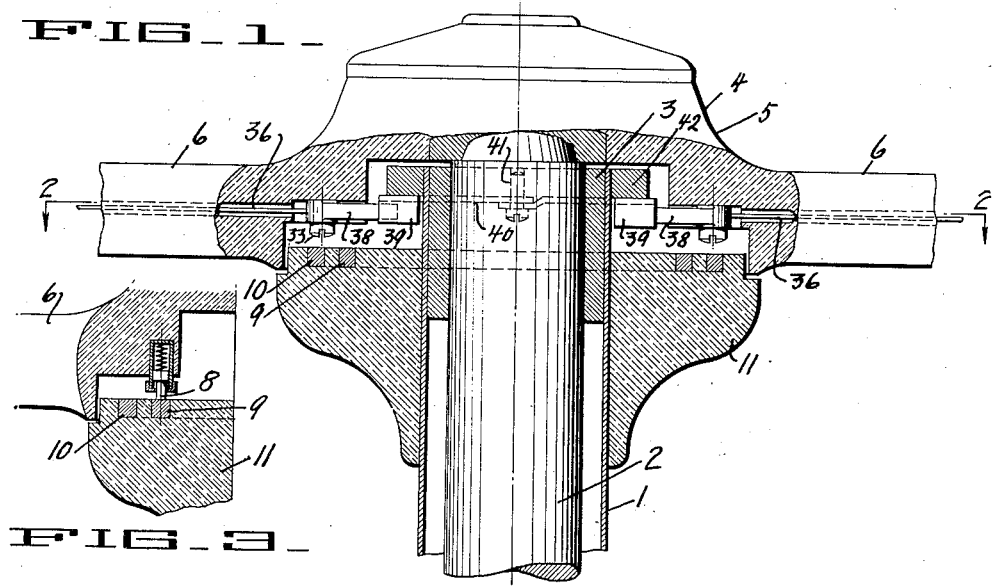
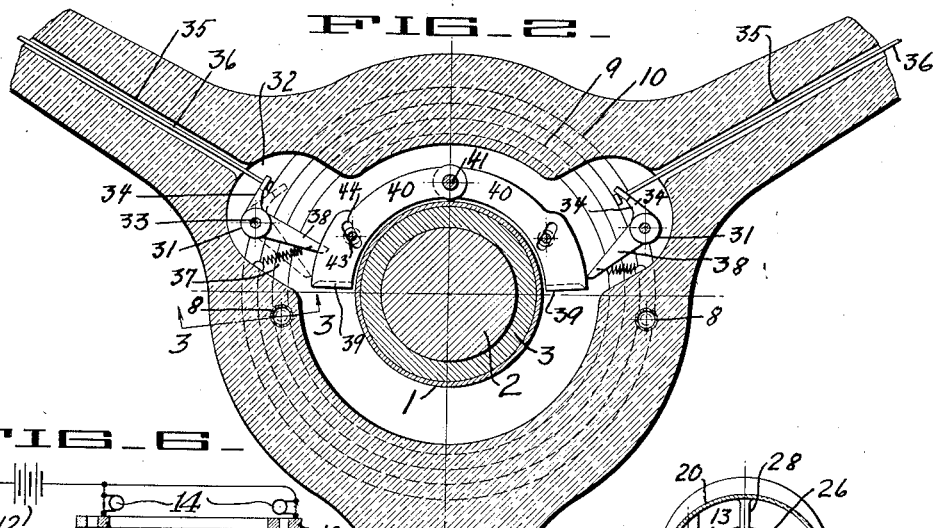
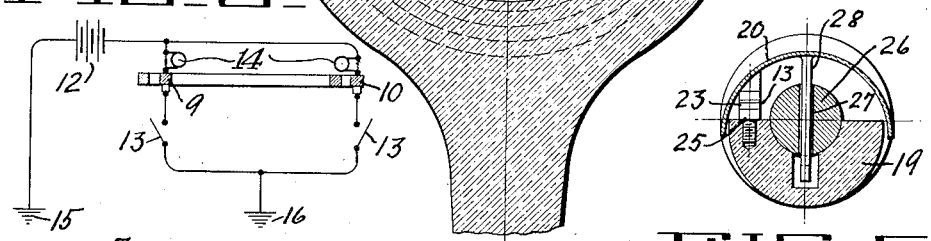
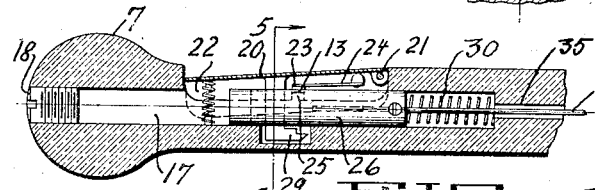
INVENTOR
Russell Elrod Frost
BY
Harry C. Schroeds
ATTORNEY Patented Feb. 16, 1937

2,070,891

UNITED STATES PATENT OFFICE 2,070,891

ELECTRICAL SWITCH

Russell Elrod Frost, Oakland, Calif.

Application July 18, 1934, Serial No. 735,755

4 Claims. (Cl. 200—59)

The present invention relates to improvements in current-controlling devices for electrical direction indicators for motor vehicles.

More particularly it is proposed in the present invention to provide a current-controlling switch for an electrical indicator of the character described that may be operated by the driver of a motor vehicle without removing his hands from the steering wheel.

It is further proposed to mount a switch of an electrically operated signalling device in a spoke of the steering wheel adjacent the rim thereof so that it may be actuated by the thumb while the hand rests on the rim of the wheel.

A further object of the invention is to provide for an automatic opening of the switch upon the return movement of the steering wheel to a straight forward position while the closed switch remains unaffected by the initial turning movement of the steering wheel.

Further objects and advantages of the present invention will appear as the specification proceeds.

The preferred form of the invention is illustrated in the accompanying drawing in which:

Fig. 1 shows a vertical section through the hub portion of a steering wheel arrangement having a portion of my switch incorporated therein, Fig. 2 a horizontal section taken along line 2—2 of Fig. 1, Fig. 3 a vertical fragmentary section taken along line 3—3 of Fig. 2, Fig. 4 a vertical section through a spoke and an adjacent portion of the rim of the steering wheel, Fig. 5 a transverse vertical section taken along line 5—5 of Fig. 4, and Fig. 6 a wiring diagram illustrating the circuit for my signalling device.

While I have shown only the preferred form of my invention I wish to have it understood that various changes or modifications may be made within the scope of the appended claims without departing from the spirit of the invention.

In its preferred form my direction indicator is connected to the steering mechanism of a motor vehicle comprising the conventional steering post 1, the shaft 2 revolvable therein and separated therefrom by the sleeve 3 and the steering wheel 4 including a hub section 5, a number of spokes 6 and the rim 7. Electrical connection between the movable and stationary parts of the steering arrangement is established by means of two spring-actuated conducting plungers 8 arranged in the bottom face of the steering wheel hub and two concentric conducting tracks 9 and 10 provided on a base 11 of insulating material secured to the post 1. The general circuit includes, as illustrated in Fig. 6, the battery 12 and two branch circuits, each including one of the tracks 9 and 10, a switch 13, a light 14 and ground connections 15 and 16. It should be understood that any other suitable signalling device may be substituted for the lights 14.

The principal part of the present invention consists in the switches 13 and their operating mechanism. The steering wheel is here shown as having three spokes and the switches 13 are mounted in two of the spokes, adjacent the rim of the steering wheel, for manual operation by the thumb of the hand resting on the rim. To accommodate the switch each of the said spokes is cored from the outer periphery of the rim to provide a central bore 17 the outer end of which may be closed by means of a plug 18. Immediately adjacent the rim the upper half of the spoke is cut away so as to leave only the lower section 19 as shown in Fig. 5. Covering this section I provide a substantially semi-circular hood 20 pivotally secured at one end as at 21 and normally urged upward, that is into alignment with the remainder of the spoke, by means of a spring 22. This hood carries one of the contacts 23 of the switch 13, mounted on a leaf spring 24. The other contact 25 of the switch 13 is mounted on the section 19 of the spoke so that pressure on the hood 20 by means of the thumb will close the switch while the spring 22 tends to open the switch.

The bore 17 has a plunger 26 slidable therein, substantially in that portion covered by the hood 20, and this plunger is provided with a vertical slot 27 through which extends a stem 28 projecting downwardly from hood 20, the stem having a certain amount of longitudinal play in the slot. The stem is provided, at its lower end, with a stepped shoe 29 which may be partly received in the slot. A spring 30 urges the plunger toward the rim of the wheel. When the hood 20 is in its normal, switch-opening position the step in the shoe 29 is confined in the slot of the plunger and holds the latter in its rearward position. When the hood is depressed, as in Fig. 4, the step in the shoe drops below the plunger and the plunger moves forward toward the rim under the influence of the spring 30, thereby moving over the step in the shoe and locking the shoe and the hood in switch closing position. It will be seen that thus when the hood is moved by the driver into switch-closing position, the hood is automatically locked in that position and remains in that position until the plunger is withdrawn.

For withdrawing the plunger I use the mechanism illustrated in the Figures 1 and 2 and comprising a lever 31 pivotally supported in a recess 32 in the hub portion of the steering wheel as at 33, in such a manner that the arm 34 of the lever extends into operative proximity to a reduced extension 35 of the bore 17. A rod 36 connects this arm of the lever with the plunger and is slidable in the lever arm in one direction. A spring 37 is active on the other lever arm 38 and tends to pull the same into the dotted line position of Figure 2 which is the normal position when the plunger is retracted. When in this position the lever arm clears a stop 39 provided at one end of an arcuate member 40 the other end of which is pivotally secured, as at 41, to a collar 42 provided at the upper end of the steering post on the longitudinal center line of the latter. Accurate adjustments in the position of the stop may be made by turning the arcuate member on its pivot and securing the same in adjusted position by means of a screw 43 passing through an arcuate slot 44.

In the normal operation of the steering wheel the lever clears the stop 39 and is not actuated by the latter. But if the driver, prior to making a turn, depresses the hood 20 for closing the switch 13, the plunger 26 moves forward for locking the switch and pulls the lever 31 into the full-line position of Fig. 2, thereby bringing the stop 39 into the path of the lever arm 38. Assuming a left hand turn is to be made and the steering wheel is turned counter-clockwise for this purpose, the lever arm 38 will strike the stop 39 and will be moved thereby. This movement, however, does not affect the switch since the lever arm 34 is free to slide on the rod 36 in this direction and after the lever has past the stop it will be drawn back into the full-line position of Fig. 2 by the spring 37. When the driver, however, returns the steering wheel to straight-forward position, the lever arm 38 again strikes the stop 39 and is now swung into the dotted-line position of Fig. 2. In thus moving the lever retracts the plunger 26 and thereby allows the hood 20 to return to normal position whereby the switch 30 is opened.

The operation of the device will be readily understood from the foregoing description. Normally the switch 13 is open, the hood 20 is in its upward position, the plunger 26 retracted and the lever 31 in the dotted-line position of Fig. 2 in which it clears the stop 39. When the driver intends to make a left-hand turn he depresses the hood 20, thereby closing the switch 13, allowing the plunger to advance for locking the switch in closed position and moving the lever into the full-line position of Fig. 2. Now the driver turns the wheel counter-clockwise and as a result the lever arm 38 strikes the stop 39, but leaves the plunger unaffected on account of the one-way connection between the lever and the rod 36. But when the driver reverses the turning movement of the steering wheel to straight forward position the lever arm again strikes the stop 39 and now withdraws the plunger whereby the hood 20 is made to return to normal position and opens the switch.

The right hand switch remains inactive during this operation but may be similarly operated by the driver when making a right-hand turn.

I claim:
1. In combination, a steering wheel, a switch mounted in a spoke thereof, means for automatically locking the switch in closed position, a lever having a one-way connection with the locking means, and adjustable means responsive to a turning movement of the wheel and acting on the lever for releasing the switch, the one-way connection permitting the lever to become effective on the switch on the reverse turning movement of the steering wheel.

2. In combination with the fixed steering post of a vehicle enclosing the steering gear shaft and a spoked steering wheel mounted on said shaft, of means for actuating signalling devices mounted in opposed spokes of said steering wheel, each of said means comprising a rod mounted within a spoke and axially movable longitudinally thereof, a plunger provided with a transverse aperture secured to the outer end of said rod adjacent the rim of said steering wheel, a spring interposed between an end of said plunger and said spoke for urging said plunger outwardly toward the rim of said steering wheel, a stem extending through said plunger aperture, said stem having an offset portion thereof engageable with said plunger in the aperture thereof for holding said plunger, against the pressure of the spring, in the extreme position of movement thereof toward the center of the steering wheel, a member pivotally mounted on said spoke and connected with said stem for releasing said offset portion thereof from said plunger when said member is manually depressed to allow retrograde movement of said plunger toward the rim of the steering wheel, a pair of contacts mounted respectively on said spoke and said member and movable into engagement, when said member is depressed, to close an electrical signalling circuit, a lever pivotally mounted on said steering wheel adjacent the center thereof and positioned on said wheel for movement in an orbital path about said steering post when said steering wheel is rotated, said lever comprising a pair of angularly disposed arms, one of said arms being connected with the inner end of said rod for movement therewith respectively only upon movement of said rod outwardly toward the rim of the steering wheel, or upon movement of said first-mentioned lever arm inwardly toward the center of the steering wheel, and a stop fixed on said steering post and projecting into the orbital path of movement of said lever for engaging the end of the other arm thereof when said steering wheel is rotated.

3. In combination with the fixed steering post of a vehicle enclosing the steering gear shaft and a spoked steering wheel mounted on said shaft, of means for actuating signalling devices mounted in opposed spokes of said steering wheel, each of said means comprising a rod mounted within a spoke and axially movable longitudinally thereof, a plunger provided with a transverse aperture secured to the outer end of said rod adjacent the rim of said steering wheel, a spring interposed between an end of said plunger and said spoke for urging said plunger outwardly toward the rim of said steering wheel, a stem extending through said plunger aperture, said stem having an offset portion thereof engageable with said plunger in the aperture thereof for holding said plunger, against the pressure of the spring, in the extreme position of movement thereof toward the center of the steering wheel, a member pivotally mounted on said spoke and connected with said stem for releasing said offset portion thereof from said plunger when said member is manually depressed to allow retrograde movement of said plunger toward the rim of the steering wheel, a pair of contacts mounted respectively on said spoke and said member and movable into engagement, when said member is depressed, to close an electrical signalling circuit, a lever pivotally mounted on said steering wheel adjacent the center thereof and positioned on said wheel for movement in an orbital path about said steering post when said steering wheel is rotated, said lever comprising a pair of angularly disposed arms, one of said arms being connected with the inner end of said rod for movement therewith respectively only upon movement of said rod outwardly toward the rim of the steering wheel, or upon movement of said first-mentioned lever arm inwardly toward the center of the steering wheel, and a stop fixed on said steering post and projecting into the orbital path of movement of said lever for engaging the end of the other arm thereof when said steering wheel is rotated, said stop being adjustable radially of the steering wheel to vary the degree of engagement between the stop and the end of said other lever arm.

4. In combination with the fixed steering post of a vehicle enclosing the steering gear shaft and a spoked steering wheel mounted on said shaft of means for actuating signalling devices mounted in opposed spokes of said steering wheel, each of said means comprising a rod mounted within a spoke and axially movable longitudinally thereof, a plunger provided with a transverse aperture secured to the outer end of said rod adjacent the rim of said steering wheel, a spring interposed between an end of said plunger and said spoke for urging said plunger outwardly toward the rim of said steering wheel, a stem extending through said plunger aperture, said stem having an offset portion thereof engageable with said plunger in the aperture thereof for holding said plunger, against the pressure of the spring, in the extreme position of movement thereof toward the center of the steering wheel, a member pivotally mounted on said spoke and connected with said stem for releasing said offset portion thereof from said plunger when said member is manually depressed to allow retrograde movement of said plunger toward the rim of the steering wheel, a pair of contacts mounted respectively on said spoke and said member and movable into engagement, when said member is depressed, to close an electrical signalling circuit, a stop fixed on said steering post, a lever pivotally mounted on said steering wheel for movement in an orbital path about said steering post, said lever comprising a pair of angularly disposed arms, one of said arms being positioned to contact said stop, when said steering wheel is rotated, to move said lever, and the other of said arms being unidirectionally operatively connected with the inner end of said rod, whereby said rod is moved axially by said lever only during rotation of said steering wheel in one direction, and is unaffected during rotation of said steering wheel in the other direction regardless of the degree of said latter rotation.

RUSSELL ELROD FROST.